(12) United States Patent
Nakano (10) Patent No.: US 9,784,968 B2
(45) Date of Patent: Oct. 10, 2017

(54) LIGHT SCANNING DEVICE THAT IMPROVES SCANNING ACCURACY OF LIGHT BEAM ON SCAN OBJECT SURFACE AND IMAGE FORMING APPARATUS INCLUDING THE SAME

(71) Applicant: KYOCERA Document Solutions Inc., Osaka (JP)

(72) Inventor: Issei Nakano, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 39 days.

(21) Appl. No.: 15/161,851

(22) Filed: May 23, 2016

(65) Prior Publication Data

US 2016/0349501 A1 Dec. 1, 2016

(30) Foreign Application Priority Data

May 27, 2015 (JP) .................. 2015-107137

(51) Int. Cl.
G02B 26/12 (2006.01)
H04N 1/06 (2006.01)
H04N 1/113 (2006.01)
G03G 15/04 (2006.01)
G02B 7/02 (2006.01)

(52) U.S. Cl.
CPC .......... *G02B 26/125* (2013.01); *G02B 7/025* (2013.01); *G02B 26/123* (2013.01); *G03G 15/04072* (2013.01); *H04N 1/06* (2013.01); *H04N 1/113* (2013.01); *G02B 7/028* (2013.01)

(58) Field of Classification Search
CPC .. G02B 26/125; G02B 26/128; G02B 26/123; G02B 7/00; G02B 7/003; G02B 7/008; G02B 7/021; G02B 7/028; H04N 5/2254

USPC ....... 358/1.9, 3.26, 3.32, 501; 399/118, 201, 399/218; 347/231, 233, 245, 257, 258
See application file for complete search history.

(56) References Cited

U.S. PATENT DOCUMENTS

| | | | |
|---|---|---|---|
| 2012/0182367 A1* | 7/2012 | Masuda | B41J 2/473 347/118 |
| 2012/0230670 A1 | 9/2012 | Hirooka | 396/529 |
| 2015/0092002 A1* | 4/2015 | Todokoro | G02B 26/125 347/118 |

FOREIGN PATENT DOCUMENTS

| | | |
|---|---|---|
| JP | 2003-5115 A | 1/2003 |
| JP | 2007-304162 A | 11/2007 |

\* cited by examiner

*Primary Examiner* — Jamares Q Washington
(74) *Attorney, Agent, or Firm* — Stein IP, LLC (57) ABSTRACT

A light scanning device includes a deflection unit, a first imaging lens, and a second imaging lens. The first imaging lens has a bottom surface adhesively secured to a housing via a plurality of adhesion portions. The second imaging lens has a bottom surface adhesively secured to a top surface of the first imaging lens via a plurality of adhesion portions. The plurality of the adhesion portions interposed between the first imaging lens and the housing are symmetrically located with respect to a center position of the first imaging lens in a main-scanning direction. The adhesion portions interposed between the first imaging lens and the second imaging lens are symmetrically located with respect to the center position of the first imaging lens in the main-scanning direction, and are located outside in the main-scanning direction with respect to the adhesion portions between the first imaging lens and the housing.

5 Claims, 9 Drawing Sheets

FIG. 2

FIG. 8
RELATED ART

LIGHT SCANNING DEVICE THAT IMPROVES SCANNING ACCURACY OF LIGHT BEAM ON SCAN OBJECT SURFACE AND IMAGE FORMING APPARATUS INCLUDING THE SAME

INCORPORATION BY REFERENCE

This application is based upon, and claims the benefit of priority from, corresponding Japanese Patent Application No. 2015-107137 filed in the Japan Patent Office on May 27, 2015, the entire contents of which are incorporated herein by reference.

BACKGROUND

Unless otherwise indicated herein, the description in this section is not prior art to the claims in this application and is not admitted to be prior art by inclusion in this section.

There has been known a typical light scanning device that includes imaging lenses layered in a plurality of stages at a bottom wall portion of a housing. This light scanning device includes a light source unit, which emits a plurality of light beams, and a deflection unit, which causes the plurality of the light beams emitted from the light source unit to be deflected to scan in the main-scanning direction. The plurality of the light beams deflected by the deflection unit pass through the imaging lens corresponding to the respective light beams to be imaged on a scan object surface.

There is proposed an example where imaging lenses are layered in the upper and lower stages.

Two imaging lenses have the same shape and three cylindrically-shaped bosses are formed at a bottom surface of the respective imaging lenses. Both sides of the respective bosses each include an adhesion portion constituted of an adhesive. Then, the lower-side imaging lens is secured to the bottom wall portion of the housing via the adhesion portion, while the upper-side imaging lens is secured to a top surface of the lower side imaging lens via the adhesion portion.

SUMMARY

A light scanning device according to one aspect of the disclosure includes a deflection unit, a first imaging lens, and a second imaging lens. The deflection unit deflects to scan a first and a second light beam emitted from a light source in a main-scanning direction. The first imaging lens has a bottom surface adhesively secured to a housing via a plurality of adhesion portions, and images the first light beam deflected to scan by the deflection unit on a scan object surface. The second imaging lens has a bottom surface adhesively secured to a top surface of the first imaging lens via a plurality of adhesion portions, and images the second light beam deflected to scan by the deflection unit on a scan object surface. The plurality of the adhesion portions interposed between the first imaging lens and the housing are symmetrically located with respect to a center position of the first imaging lens in the main-scanning direction. The plurality of the adhesion portions interposed between the first imaging lens and the second imaging lens are symmetrically located with respect to the center position of the first imaging lens in the main-scanning direction, and are located outside in the main-scanning direction with respect to the plurality of the adhesion portions between the first imaging lens and the housing.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes the embodiments of the disclosure with reference to the drawings in detail. The disclosure will not be limited to the following embodiments.

Embodiment 1

Figure 1:
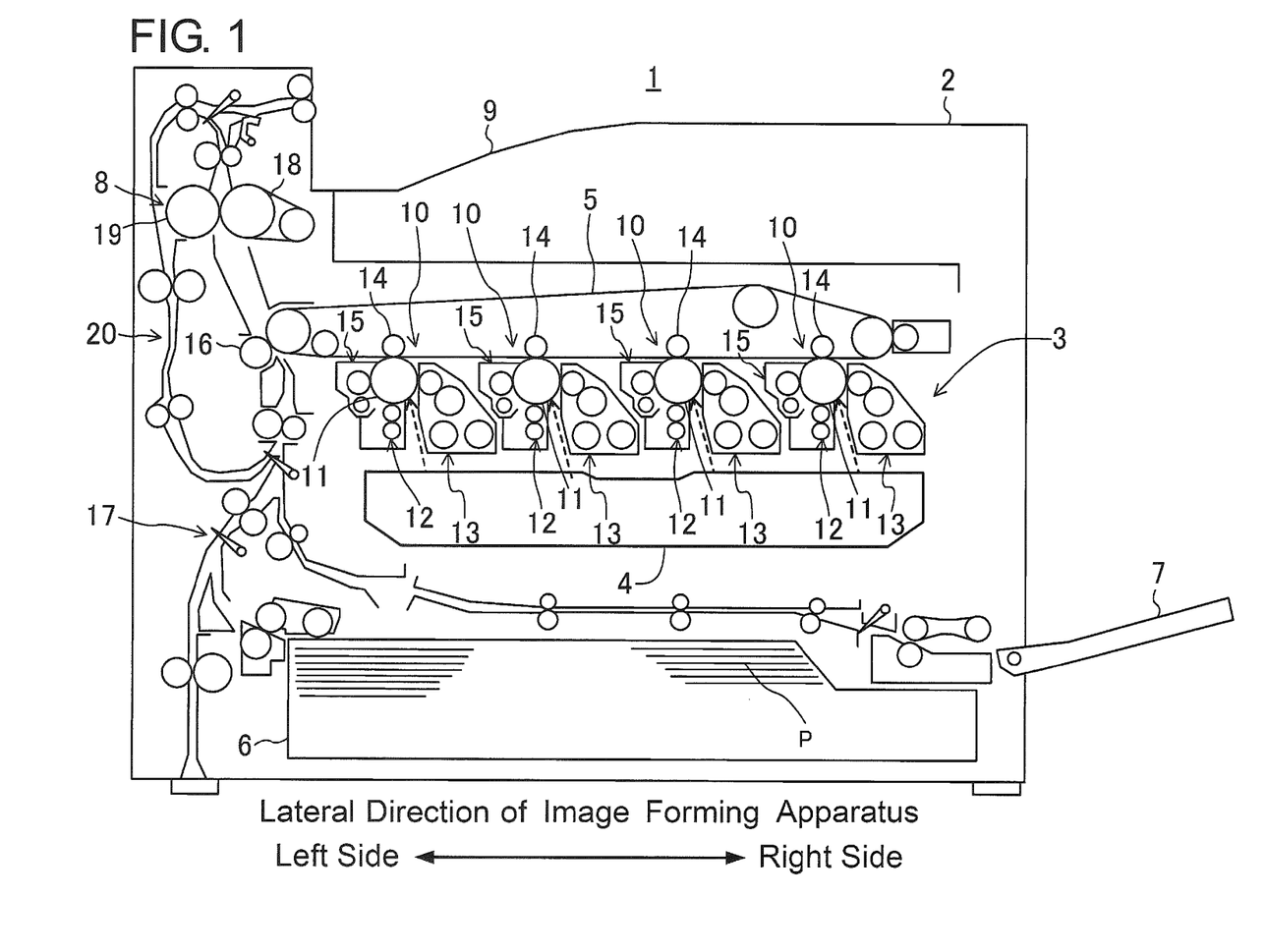
FIG. 1 schematically illustrates a configuration of an image forming apparatus according to each embodiment.

FIG. 1 schematically illustrates a configuration of an image forming apparatus 1 according to one embodiment. This image forming apparatus 1 is a tandem type color printer and includes an image forming unit 3 in a box-shaped casing 2. This image forming unit 3 is a place at which an image is transferred and formed on a recording sheet P based on image data transmitted from an external device such as a computer, which is, for example, connected to a network. Below the image forming unit 3, a light scanning device 4, which irradiates photoreceptor drums 11 with a light beam (a laser beam), is located, and a transfer belt 5 is located above the image forming unit 3. Below the light scanning device 4, a paper sheet storage unit 6, which stores the recording sheet P, is located, and a manual paper feed tray 7 is located at a side portion of the paper sheet storage unit 6. At a lateral upper portion of the transfer belt 5, a fixing unit 8, which performs a fixing process on the image transferred and formed on the recording sheet P, is located. At an upper portion of the casing 2, a paper sheet discharge unit 9 is located and discharges the recording sheet P on which the fixing process is performed by the fixing unit 8.

The image forming unit 3 includes four image formation units 10 arranged along the transfer belt 5 in one row. These image formation units 10 include the photoreceptor drums 11. Immediately below each photoreceptor drum 11, a charger 12 is located. At one side portion of each photoreceptor drum 11, a developing device 13 is located. Immediately above each photoreceptor drum 11, a primary transfer roller 14 is located. At another side portion of each photoreceptor drum 11, a cleaning unit 15, which cleans a circumference surface of the photoreceptor drum 11, is located.

Then, the charger 12 electrostatically and uniformly charges the circumference surface of each photoreceptor drum 11. After this electrostatic charge, the light scanning device 4 irradiates the circumference surfaces of photoreceptor drums 11 with laser beams corresponding to respective colors based on image data received from, for example, the above-described computer to form an electrostatic latent image on the circumference surface of the respective photoreceptor drums 11. The developing device 13 supplies this electrostatic latent image with a developer to form a yellow, magenta, cyan, or black toner image on the circumference surface of each of the photoreceptor drums 11. These toner images are each transferred and superimposed onto the transfer belt 5 by a transfer bias applied by the primary transfer roller 14.

Below the fixing unit 8, a secondary transfer roller 16 is located in contact with the transfer belt 5. The recording sheet P conveyed from the paper sheet storage unit 6 or the manual paper feed tray 7 to a paper sheet conveyance passage 17 is sandwiched between the secondary transfer roller 16 and the transfer belt 5. The toner image on the transfer belt 5 is transferred on the recording sheet P by a transfer bias applied to the secondary transfer roller 16.

The fixing unit 8 includes a heating roller 18 and a pressure roller 19. These heating roller 18 and pressure roller 19 sandwich the recording sheet P to heat and apply pressure, and then this causes the toner image transferred on the recording sheet P to be fixed on the recording sheet P. After the fixing process, the recording sheet P is discharged by the paper sheet discharge unit 9. The recording sheet P discharged from the fixing unit 8 is inverted by an inverting conveyance path 20 when a duplex printing is performed.

Figure 2:
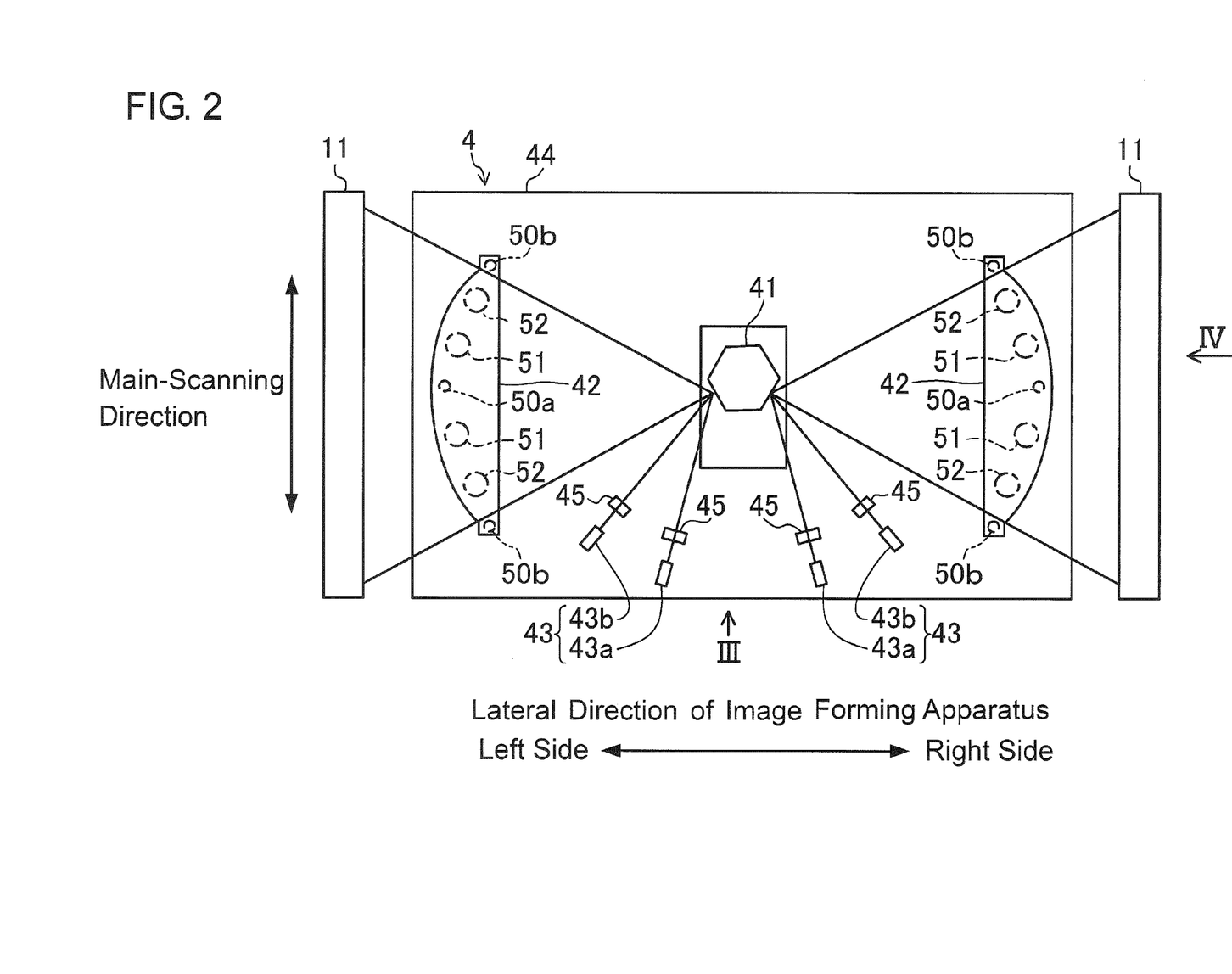
FIG. 2 schematically illustrates a plan view of a light scanning device according to Embodiment 1.
Figure 3:
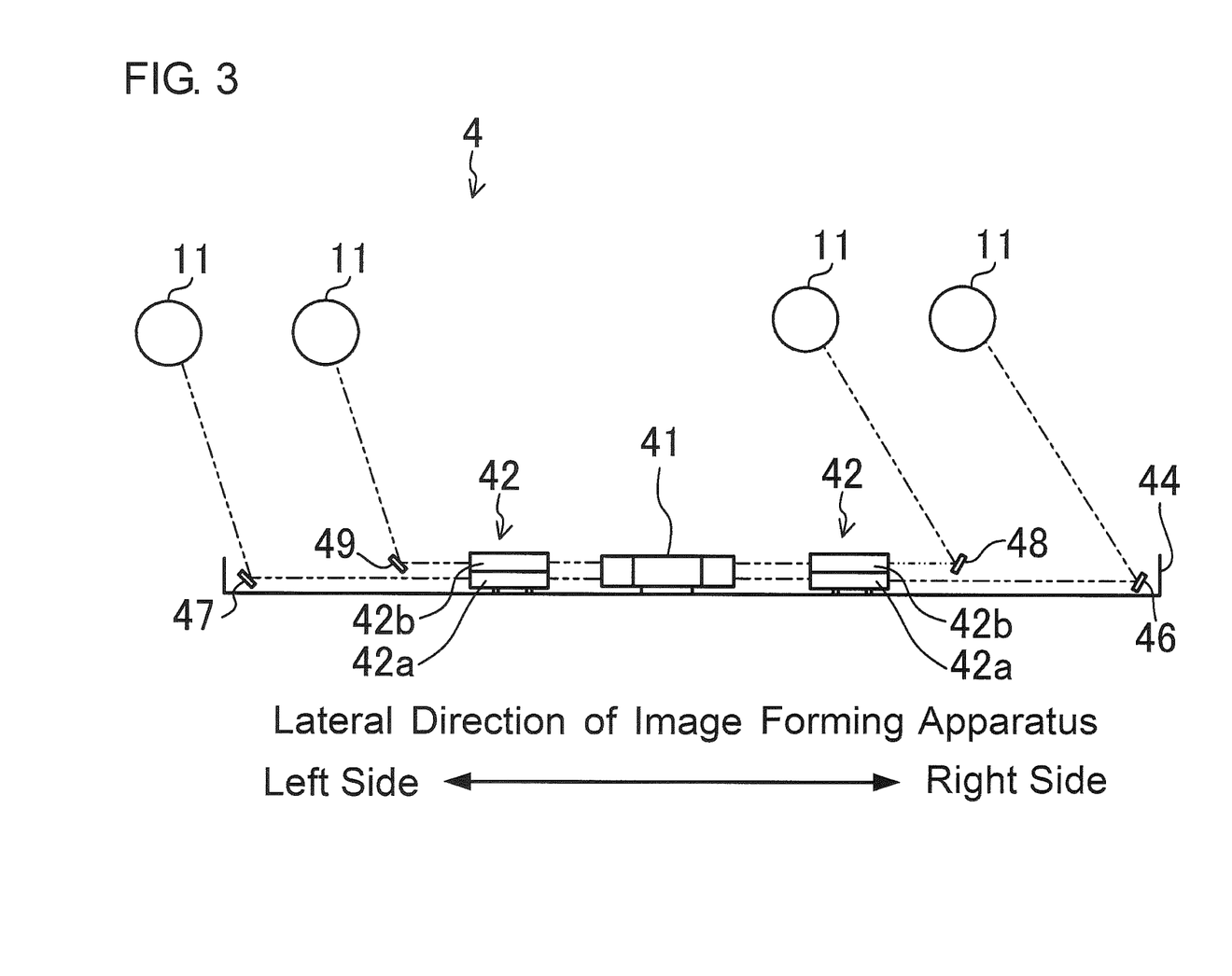
FIG. 3 illustrates III direction arrow view of FIG. 2.

Next, the following describes the above-described light scanning device 4 in detail. FIG. 2 illustrates a plan view of an internal configuration of the light scanning device 4 according to Embodiment 1. FIG. 3 illustrates III direction arrow view of FIG. 2. The light scanning device 4 includes a housing 44, which houses a polygon mirror 41 as a deflection unit. The housing 44 is opened in an upper direction, and an upper side of the housing 44 is closed by a lid member (not illustrated). The polygon mirror 41 is located at the center portion of a bottom wall portion of the housing 44. The polygon mirror 41 is secured to a distal end portion of a drive shaft of a polygon motor (not illustrated). The above-described polygon mirror 41 is formed in a regular-hexagonal shape that has a side surface that has six reflecting surfaces. Then, the polygon motor rotatably drives the polygon mirror 41 at a predetermined speed, and this causes a light beam emitted from respective light source units 43 to be reflected to perform a deflection scan.

At the bottom wall portion of the housing 44, a pair of optical devices 42 is symmetrically located across the polygon mirror 41. Similarly, at the bottom wall portion of the housing 44, a pair of the light source units 43 is symmetrically located across the polygon mirror 41.

As illustrated in FIG. 3, each optical devices 42 is constituted of a lower imaging lens (a first imaging lens) 42a and an upper imaging lens (a second imaging lens) 42b, which are layered in upper and lower stages. Respective imaging lenses 42a and 42b are constituted of fθ lenses swollen toward an opposite side toward the polygon mirror 41 side at the center portion in the main-scanning direction. The respective imaging lenses 42a and 42b have a constant height in the main-scanning direction.

Returning to FIG. 2, each of the light source units 43 described above includes a lower laser light source 43a and an upper laser light source 43b. The lower laser light source 43a emits a light beam to the polygon mirror 41, for the lower imaging lens 42a. The upper laser light source 43b emits a light beam to the polygon mirror 41, for the upper imaging lens 42b. Between the respective laser light sources 43a and 43b and the polygon mirror 41, collimator lenses (not illustrated) and cylindrical lenses 45 are located.

As illustrated in FIG. 3, during operation of the light scanning device 4, after the polygon mirror 41 deflects to scan the respective light beams emitted from the lower laser light sources 43a of the respective light source units 43, the light beams pass through the lower imaging lenses 42a of the respective optical devices 42. Then, after the light beams are reflected by reflection mirrors 46 and 47 to be imaged on the photoreceptor drums 11 and the polygon mirror 41 deflects to scan the respective light beams emitted from the upper laser light sources 43b of the respective light source units 43, the light beams pass through the upper imaging lenses 42b of the respective optical devices 42. Then, the light beams are reflected by reflection mirrors 48 and 49 to be imaged on the photoreceptor drums 11. The photoreceptor drum 11 has a surface that is constituted of a scan object surface of each of the light beams.

Figure 4:
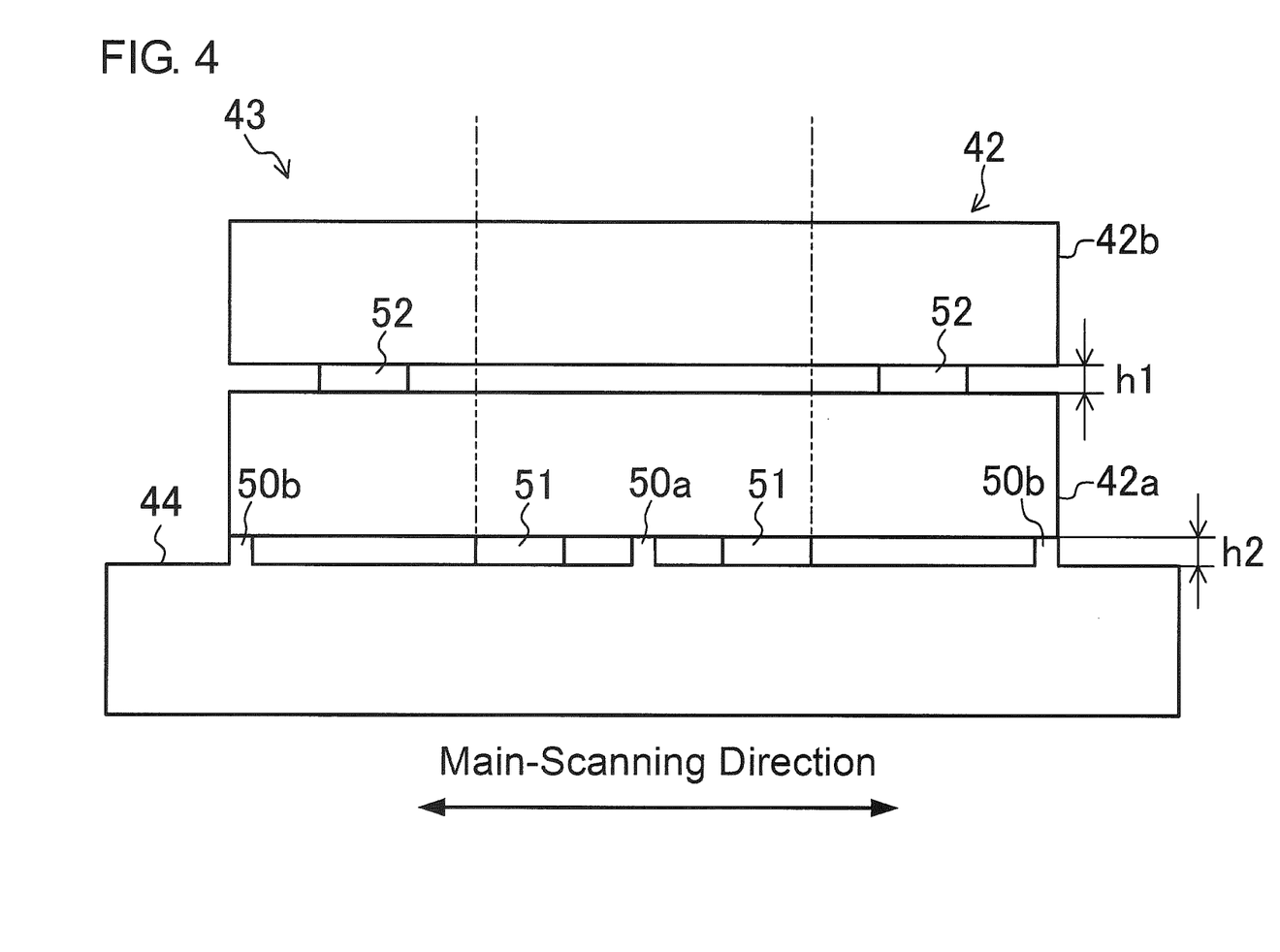
FIG. 4 illustrates IV direction arrow view of FIG. 2.

As illustrated in FIG. 4, the lower imaging lens 42a of each of the optical devices 42 is supported by three bosses 50a and 50b, which are projected from the bottom wall portion of the housing 44 toward an upper side from a lower side. The respective bosses 50a and 50b are each formed in a columnar shape and integrally formed with the housing 44. The three bosses 50a and 50b include a center boss 50a and a pair of end portion bosses 50b. The center boss 50a supports the center portion of the lower imaging lens 42a in the main-scanning direction. The pair of the end portion bosses 50b support respective both end portions of the lower imaging lens 42a in the main-scanning direction. Viewing from the upper side, the center boss 50a supports an end portion of a bulge side on the center portion of the lower imaging lens 42a in the main-scanning direction (see FIG. 2). At both sides of the main-scanning direction across the center boss 50a, lower adhesion portions 51 are each located. The lower adhesion portion 51, for example, is constituted of an adhesive such as a photocurable resin. The lower imaging lens 42a has a bottom surface secured to the bottom wall portion of the housing 44 via this pair of the lower adhesion portions 51 (see FIG. 4). Viewing in a lens thickness direction (a direction orthogonal to a height direction of the lower imaging lens 42a and the main-scanning direction), the pair of the lower adhesion portions 51 is symmetrically located with respect to the center position of the lower imaging lens 42a in the main-scanning direction. The one lower adhesion portion 51 and the other lower adhesion portion 51 have the same volume and mass.

The upper imaging lens 42b has the same size and shape as the size and shape of the lower imaging lens 42a. The upper imaging lens 42b has a bottom surface adhesively secured to a top surface of the lower imaging lens 42a via a pair of upper adhesion portions 52. The pair of the upper adhesion portions 52 is made of, for example, an adhesive such as a photocurable resin, similarly to the lower adhesion portion 51. Viewing in the lens thickness direction, the pair of the upper adhesion portions 52 is symmetrically located with respect to the center position of the lower imaging lens 42a in the main-scanning direction. The one upper adhesion portion 52 and the other upper adhesion portion 52 have the identical volume and mass. The pair of the upper adhesion portions 52 are located outside in the main-scanning direction with respect to the pair of the lower adhesion portions 51 (the two-dot chain lines in FIG. 4). The upper adhesion portion 52 has a height (that is, an interval h1 between the top surface of the lower imaging lens 42a and a bottom surface of the upper imaging lens 42b) equal to a height of the lower adhesion portion 51 (an interval h2 between a bottom surface of the lower imaging lens 42a and the bottom wall portion of the housing 44). The total mass of the pair of the upper adhesion portions 52 is equal to the total mass of the pair of the lower adhesion portions 51.

Figure 8:
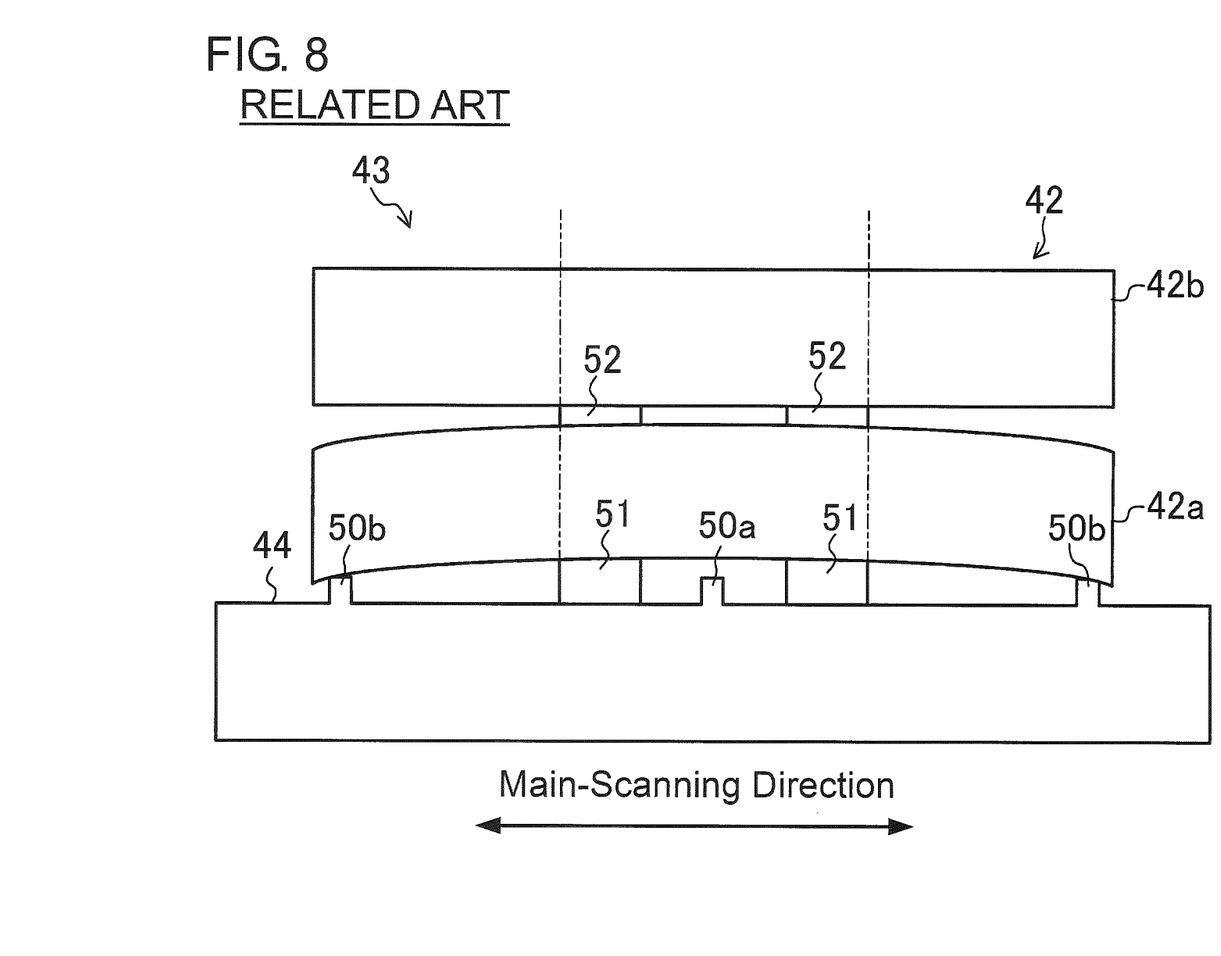
FIG. 8 schematically illustrates a state where a lower imaging lens in a light scanning device as a typical example deforms due to a change of an environmental temperature.

Here, in a typical light scanning device 4 (see FIG. 8), viewing in a lens thickness direction, a lower adhesion portion 51 and an upper adhesion portion 52 are located at the identical positions in the main-scanning direction. In view of this, when an environmental temperature changes due to, for example, a heat during rotation of a polygon mirror 41, a difference of a linear expansion coefficient between a housing 44 and a lower imaging lens 42a causes a problem of a warp occurring on the lower imaging lens 42a. The example in FIG. 8 indicates an example that the center portion of the lower imaging lens 42a is warped upward with respect to both the end portions of the lower imaging lens 42a. This warping deformation is generated because the lower imaging lens 42a expands or contracts in the main-scanning direction due to a change of a temperature although the lower imaging lens 42a is secured to a bottom wall portion of the housing 44 by the lower adhesion portion 51. The generated such warping deformation of the lower imaging lens 42a causes a problem that optical performance of the lower imaging lens 42a deteriorates, and consequently scanning accuracy of a light beam on a photoreceptor drum 11 deteriorates.

In contrast to this, in the embodiment, the pair of the upper adhesion portions 52, which bond the lower imaging lens 42a and the upper imaging lens 42b, are located outside in the main-scanning direction with respect to the lower adhesion portions 51, which bond the lower imaging lens 42a and the housing 44, and this causes the upper adhesion portions 52 to reduce the warping deformation of the lower imaging lens 42a. Thus, the embodiment ensures the reduced deterioration of scanning accuracy of the light beams due to the warping deformation of the lower imaging lens 42a.

Moreover, in the embodiment, the pair of the lower adhesion portions 51 and the pair of the upper adhesion portions 52 are each symmetrically located with respect to the center position of the lower imaging lens 42a in the main-scanning direction. This causes the adhesive securing force to equally act right and left on the lower imaging lens 42a, which further reliably ensures the reduced warping deformation of the lower imaging lens 42a due to the change in environmental temperature.

Embodiment 2

Figure 5:
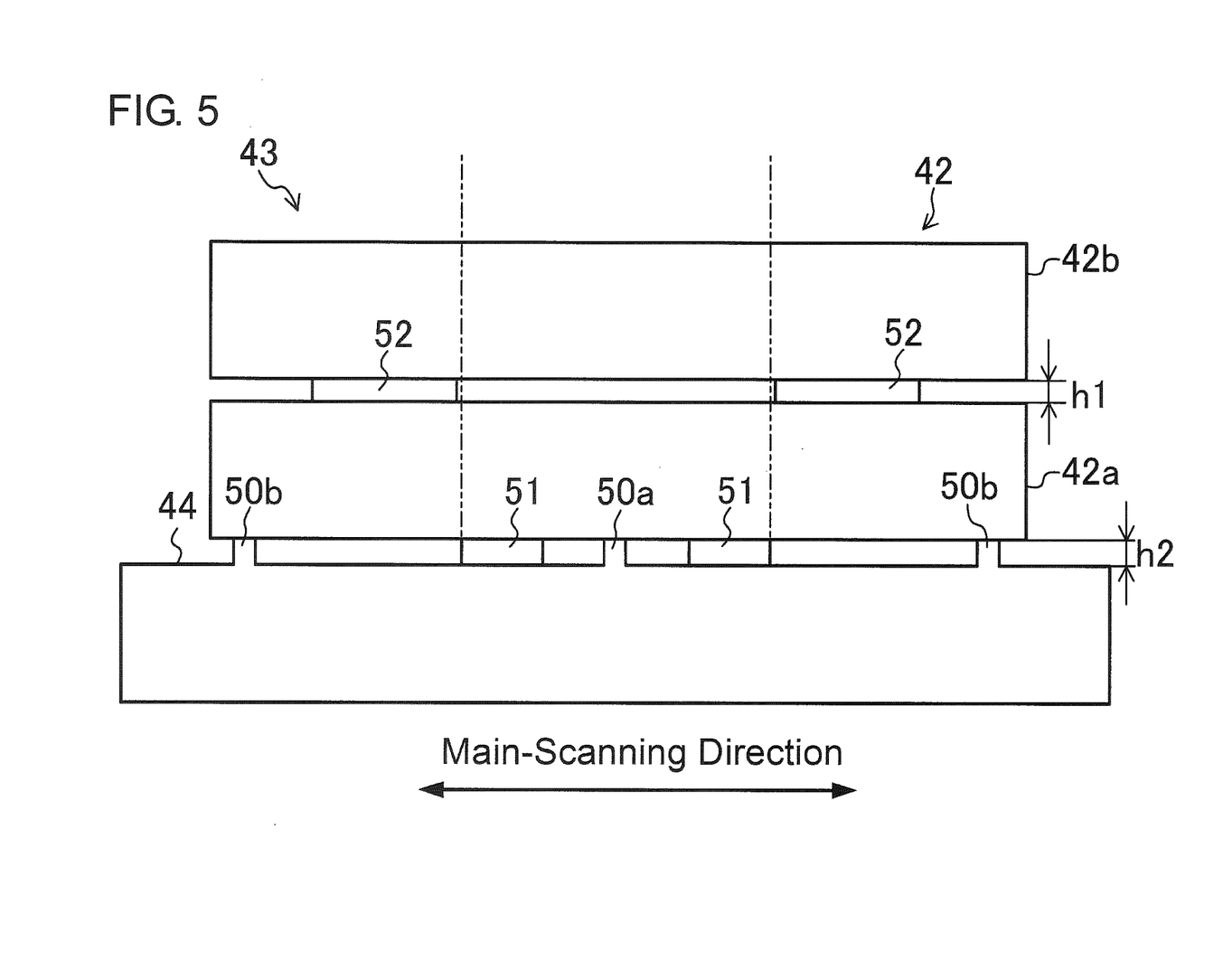
FIG. 5 illustrates the IV direction arrow view of a light scanning device according to Embodiment 2.

FIG. 5 illustrates IV direction arrow view of a light scanning device according to Embodiment 2. In this embodiment, an adhesion area between each of upper adhesion portions 52 and the lower imaging lens 42a is different from above-described Embodiment 1. Except for this, a configuration of this embodiment is the same as Embodiment 1. The following embodiments use the same reference numerals as Embodiment 1 for the same components as Embodiment 1 and will not further elaborate the components here.

Namely, in this embodiment, the adhesion area between each of the upper adhesion portions 52 and the lower imaging lens 42a is configured to be wider than an adhesion area between each of the lower adhesion portions 51 and the lower imaging lens 42a. Thus, this enhances the adhesion force of the pair of the upper adhesion portions 52 to both the imaging lenses 42a and 42b, so as to reliably ensure the reduced warping deformation of the lower imaging lens 42a due to the change in environmental temperature. This further reliably ensures the actions and effects similar to Embodiment 1.

Embodiment 3

Figure 6:
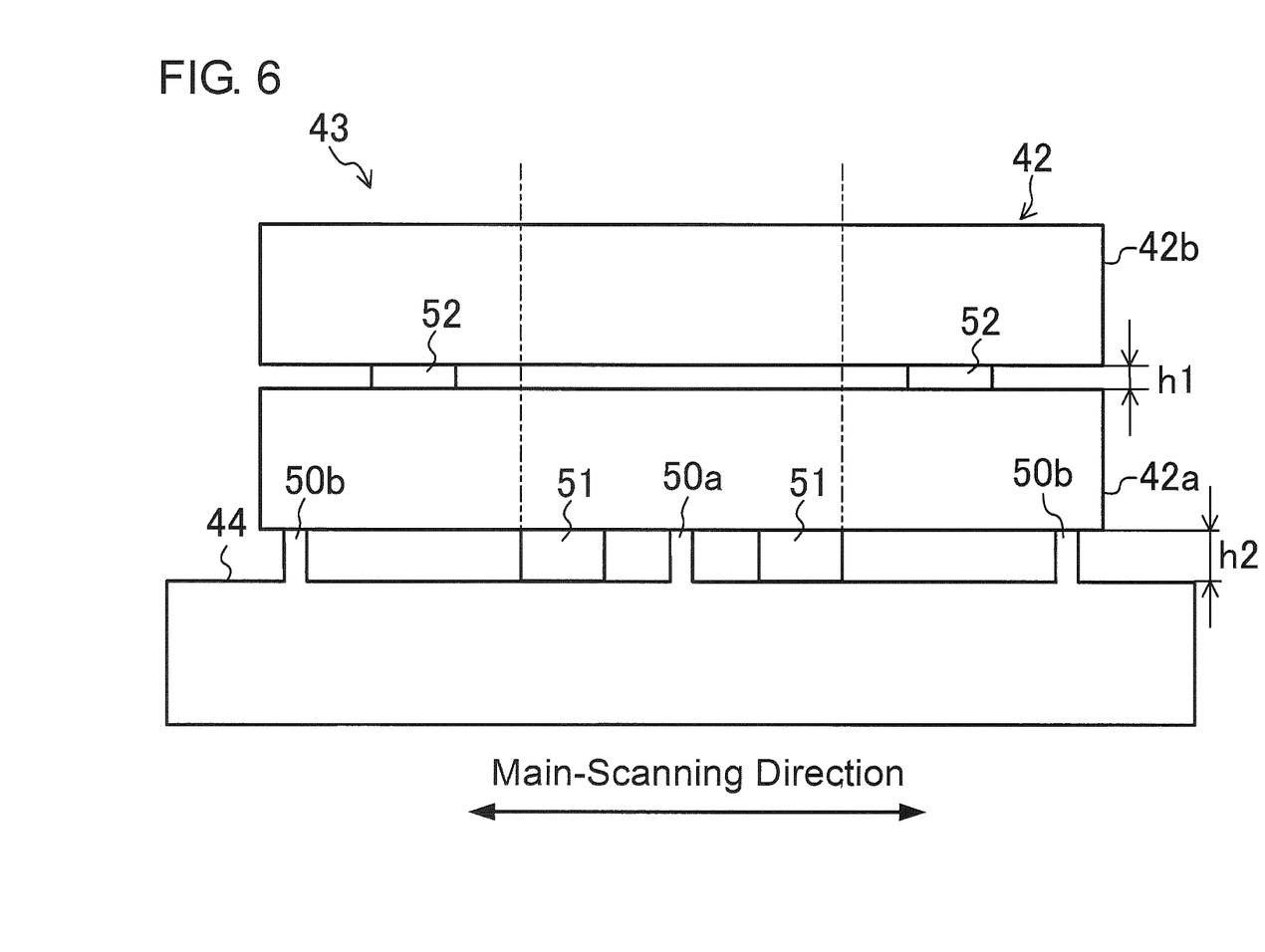
FIG. 6 illustrates the IV direction arrow view of a light scanning device according to Embodiment 3.

FIG. 6 illustrates the IV direction arrow view of a light scanning device according to Embodiment 3. This embodiment is different from each of the embodiments described above in that the lower adhesion portion 51 is more deformable in the main-scanning direction than the upper adhesion portion 52. Except for this, a configuration of this embodiment is the same as Embodiment 1.

Figure 7:
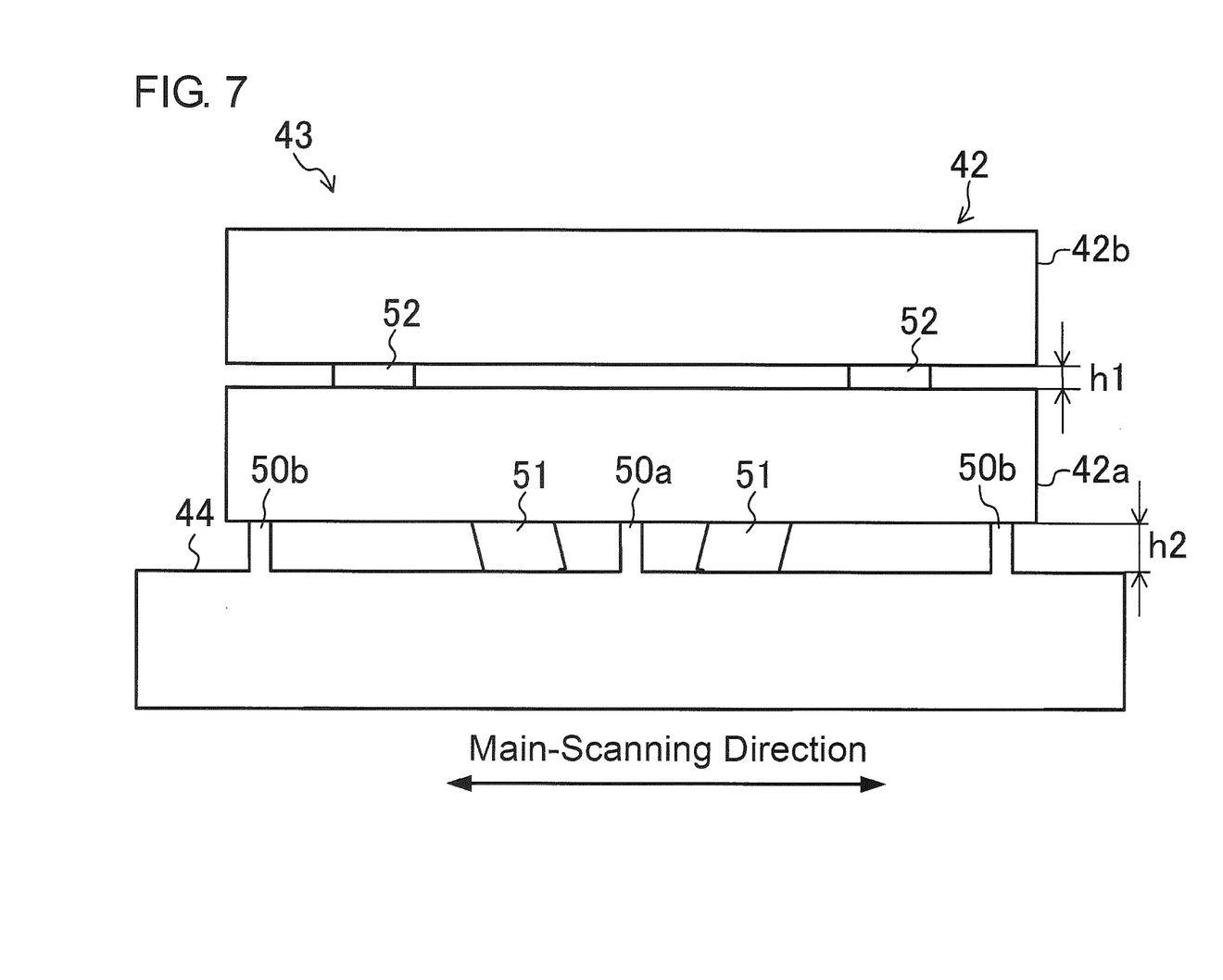
FIG. 7 illustrates an explanatory diagram to describe a process to reduce a warping deformation on a lower imaging lens in the light scanning device of Embodiment 3.

Namely, in this embodiment, the adhesion area between each of the lower adhesion portions 51 and the lower imaging lens 42a is configured to be equal to the adhesion area between each of the upper adhesion portions 52 and the lower imaging lens 42a, while the interval h2 between the lower imaging lens 42a and the bottom wall portion of the housing 44 is sufficiently wider (for example, twice or more than twice) than the interval h1 between the lower imaging lens 42a and the upper imaging lens 42b. This causes the lower adhesion portion 51 to be easily deformed in the main-scanning direction compared with the upper adhesion portion 52. Thus, when the environmental temperature changes, the lower adhesion portion 51 deforms in the main-scanning direction as illustrated in FIG. 7, and this reduces the warping deformation of the lower imaging lens 42a. This further reliably ensures the operational effects similar to Embodiment 1. This Embodiment 3 may have an adhesion area between each of the lower adhesion portions 51 and the lower imaging lens 42a smaller than the adhesion area between each of the upper adhesion portions 52 and the lower imaging lens 42a. This is preferred because this further enhances deformability of the lower adhesion portion 51 in the main-scanning direction.

Other Embodiments

Figure 9:
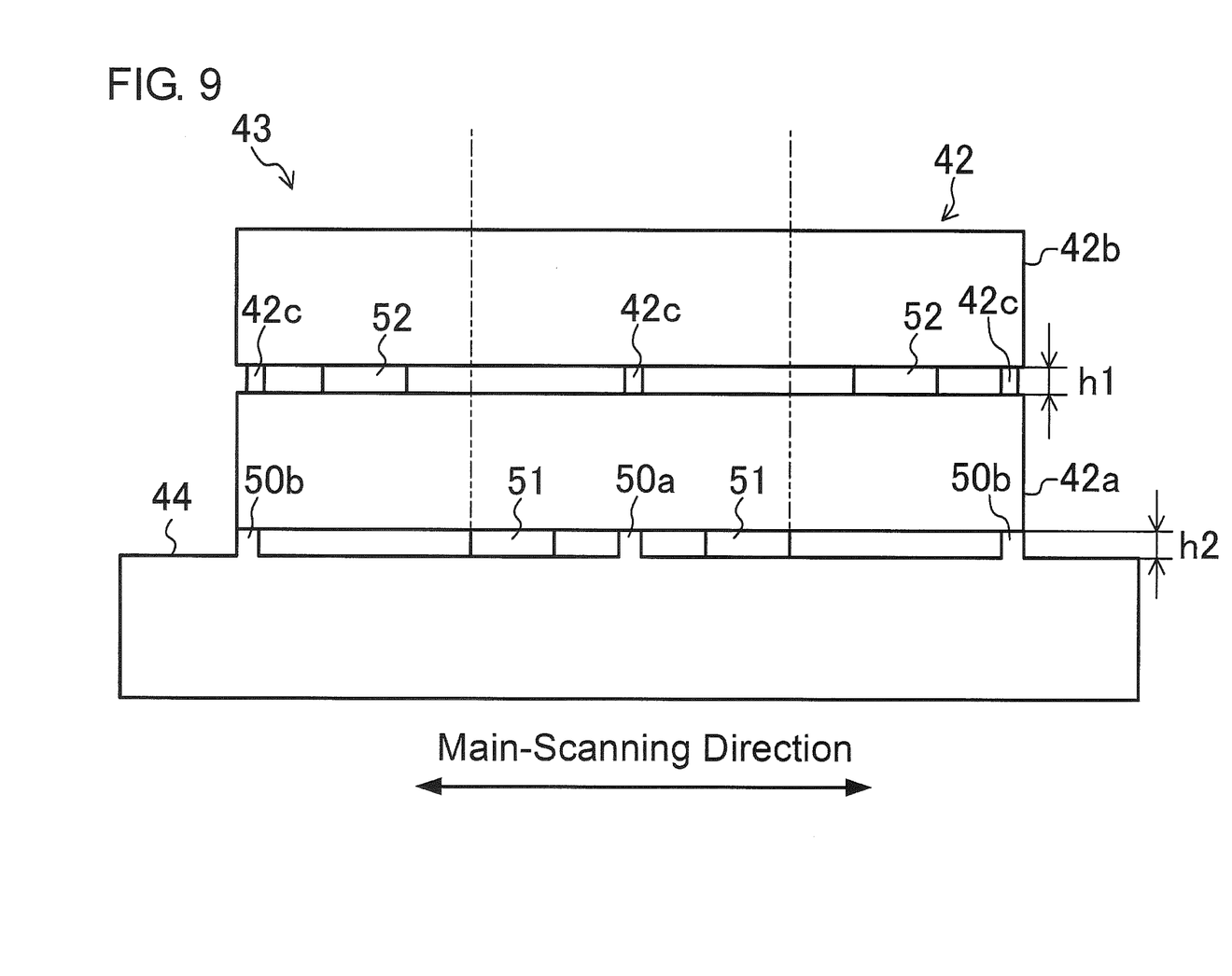
FIG. 9 illustrates the IV direction arrow view of a light scanning device according to other embodiments.

The respective embodiments described above may be configured to include, for example, a protruding seat portion 42c on the top surface of the lower imaging lens 42a (see FIG. 9). This protruding seat portion 42c has, for example, a columnar shape and is integrated and molded with the lower imaging lens 42a.

With this configuration, the protruding seat portion 42c ensures the further accurate regulation of the interval between the lower imaging lens 42a and the upper imaging lens 42b. Thus, this ensures the further accurate management of the height and adhesion area of the upper adhesion portion 52. This configuration may include the protruding seat portion 42c that is located at the bottom surface of the upper imaging lens 42b.

While the respective embodiments described above have been described the example that the light scanning device 4 is applied to a printer, the disclosure should not be construed in a limiting sense. The light scanning device 4 may be applied to, for example, a facsimile or a projector.

Additionally, the disclosure should not be limited to Embodiments 1 to 3 described above and includes a configuration appropriately combined these Embodiments 1 to 3.

As described above, the disclosure is effective for a light scanning device and an image forming apparatus that includes this light scanning device.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A light scanning device, comprising:
    a deflection unit that deflects to scan a first and a second light beam emitted from a light source in a main-scanning direction;
    a first imaging lens having a bottom surface adhesively secured to a housing via a plurality of adhesion portions, the first imaging lens imaging the first light beam deflected to scan by the deflection unit on a scan object surface; and
    a second imaging lens having a bottom surface adhesively secured to a top surface of the first imaging lens via a plurality of adhesion portions, the second imaging lens imaging the second light beam deflected to scan by the deflection unit on the scan object surface,
    wherein the plurality of the adhesion portions interposed between the first imaging lens and the housing are symmetrically located with respect to a center position of the first imaging lens in the main-scanning direction, and
    the plurality of the adhesion portions interposed between the first imaging lens and the second imaging lens are symmetrically located with respect to the center position of the first imaging lens in the main-scanning direction, and are located outside in the main-scanning direction with respect to the plurality of the adhesion portions between the first imaging lens and the housing.

2. The light scanning device according to claim 1, wherein adhesion portions interposed between the first imaging lens and the second imaging lens each have an adhesion area larger than each adhesion area of adhesion portions interposed between the first imaging lens and the housing.

3. The light scanning device according to claim 1, wherein the adhesion portions interposed between the first imaging lens and the housing are each more deformable in the main-scanning direction than each of the adhesion portions interposed between the first imaging lens and the second imaging lens.

4. The light scanning device according to claim 3, wherein the adhesion portions interposed between the first imaging lens and the housing each have a larger height dimension than a height dimension of each of the adhesion portions interposed between the first imaging lens and the second imaging lens, so to be more deformable in the main-scanning direction than each of the adhesion portions interposed between the first imaging lens and the second imaging lens.

5. An image forming apparatus, comprising the light scanning device according to claim 1.

* * * * *